US012640583B2

(12) United States Patent
Wang et al.

(10) Patent No.: US 12,640,583 B2
(45) Date of Patent: May 26, 2026

(54) POWER DEVICE

(71) Applicant: CYBER POWER SYSTEMS, INC.,
Taipei City (TW)

(72) Inventors: Hung-Chih Wang, Taipei City (TW);
Kai-Tsung Yang, Taipei City (TW);
Yu-Chieh Lin, Taipei City (TW)

(73) Assignee: CYBER POWER SYSTEMS, INC.,
Taipei City (TW)

( * ) Notice: Subject to any disclaimer, the term of this
patent is extended or adjusted under 35
U.S.C. 154(b) by 0 days.

(21) Appl. No.: 18/756,338

(22) Filed: Jun. 27, 2024

(65) Prior Publication Data

US 2025/0337269 A1     Oct. 30, 2025

(30) Foreign Application Priority Data

Apr. 26, 2024     (CN) ......................... 202420893454.5

(51) Int. Cl.
| | |
|---|---|
| *H02J 9/06* | (2006.01) |
| *H02J 3/32* | (2026.01) |
| *H02J 7/06* | (2006.01) |
| *H02J 7/82* | (2026.01) |
| *H02J 7/90* | (2026.01) |
| *H02J 7/96* | (2026.01) |

(52) U.S. Cl.
CPC ................ H02J 9/062 (2013.01); H02J 3/32
(2013.01); H02J 7/06 (2013.01); H02J 7/82
(2026.01); H02J 7/927 (2026.01); H02J 7/96
(2026.01); *H02J 2207/20* (2020.01)

(58) Field of Classification Search
CPC ...... H02J 9/062; H02J 7/0048; H02J 7/00711;
H02J 7/007182; H02J 3/32; H02J 7/06;
H02J 2207/20
USPC ........................................................ 307/66
See application file for complete search history.

(56) References Cited

U.S. PATENT DOCUMENTS

| | | | | |
|---|---|---|---|---|
| 5,982,596 | A * | 11/1999 | Spencer ................. | H02H 3/006 |
| | | | | 361/64 |
| 9,424,886 | B1* | 8/2016 | Ma ........................ | G11B 33/144 |
| 2019/0067989 | A1* | 2/2019 | Beg .......................... | H02J 3/381 |
| 2022/0376547 | A1* | 11/2022 | Yang ................. | H02J 7/007194 |

* cited by examiner

*Primary Examiner* — Michael R. Fin
(74) *Attorney, Agent, or Firm* —
BACON&THOMAS,PLLC

(57) ABSTRACT

A power device comprises a buzzer, a control unit, and a
driving circuit. The control unit records a plurality of PWM
frequencies corresponding to various pitches, and is config-
ured to generate a PWM signal according to an alert sound
corresponding to a determination result, and to change the
frequency of the PWM signal according to at least two
pitches of the alert sound. As to the driving circuit, it is
configured to drive the buzzer to emit the alert sound
according to the PWM signal.

10 Claims, 15 Drawing Sheets

100

POWER DEVICE

BACKGROUND OF THE INVENTION

Field of the Invention

The present invention relates to the technical field of power supply, and more particularly to a power device.

Description of Related Art

Uninterruptible power system (UPS) is configured to provide backup power to equipment (such as computers, servers or medical equipment) when the AC mains fails, so that the equipment can still operate normally. Therefore, it is very important to users to obtain the current state and behavior of the UPS in real time so that the user can take corresponding actions to ensure the normal operation of the UPS.

SUMMARY OF THE INVENTION

An object of the present invention is to provide a power device that allows users to obtain the current state and behavior of the power device in real time.

To achieve the above objective, the present invention provides a power device, which comprises a buzzer, a control unit, and a driving circuit. The control unit records a plurality of PWM frequencies corresponding to various pitches, and is configured to generate a PWM signal according to an alert sound corresponding to a determination result, and to change the frequency of the PWM signal according to at least two pitches of the alert sound. As to the driving circuit, it is configured to drive the buzzer to emit the alert sound according to the PWM signal.

In one embodiment of the present invention, the power device is a UPS.

In another embodiment of the present invention, the power device is a power distribution unit.

In still another embodiment of the present invention, the power device is an automatic transfer switch.

In order to make the above objects, technical features and gains after actual implementation more obvious and easy to understand, in the following, the preferred embodiments will be described with reference to the corresponding drawings and will be described in more detail.

BRIEF DESCRIPTION OF THE DRAWINGS

Other features and advantages of the present invention will become apparent in the following detailed description of the preferred embodiments with reference to the accompanying drawings, of which.

DESCRIPTION OF EMBODIMENTS

The characteristics, contents, advantages and achieved effects of the present disclosure will become more fully understood from the detailed description given herein below and the accompanying drawings which are given by way of illustration only, and thus are not limitative of the present disclosure.

As required, detailed embodiments are disclosed herein. It must be understood that the disclosed embodiments are merely exemplary of and may be embodied in various and alternative forms, and combinations thereof. As used herein, the word "exemplary" is used expansively to refer to embodiments that serve as illustrations, specimens, models, or patterns. The figures are not necessarily to scale and some features may be exaggerated or minimized to show details of particular components. In other instances, well-known components, systems, materials, or methods that are known to those having ordinary skill in the art have not been described in detail in order to avoid obscuring the present disclosure. Therefore, specific structural and functional details disclosed herein are not to be interpreted as limiting, but merely as a basis for the claims and as a representative basis for teaching one skilled in the art.

Figure 1:
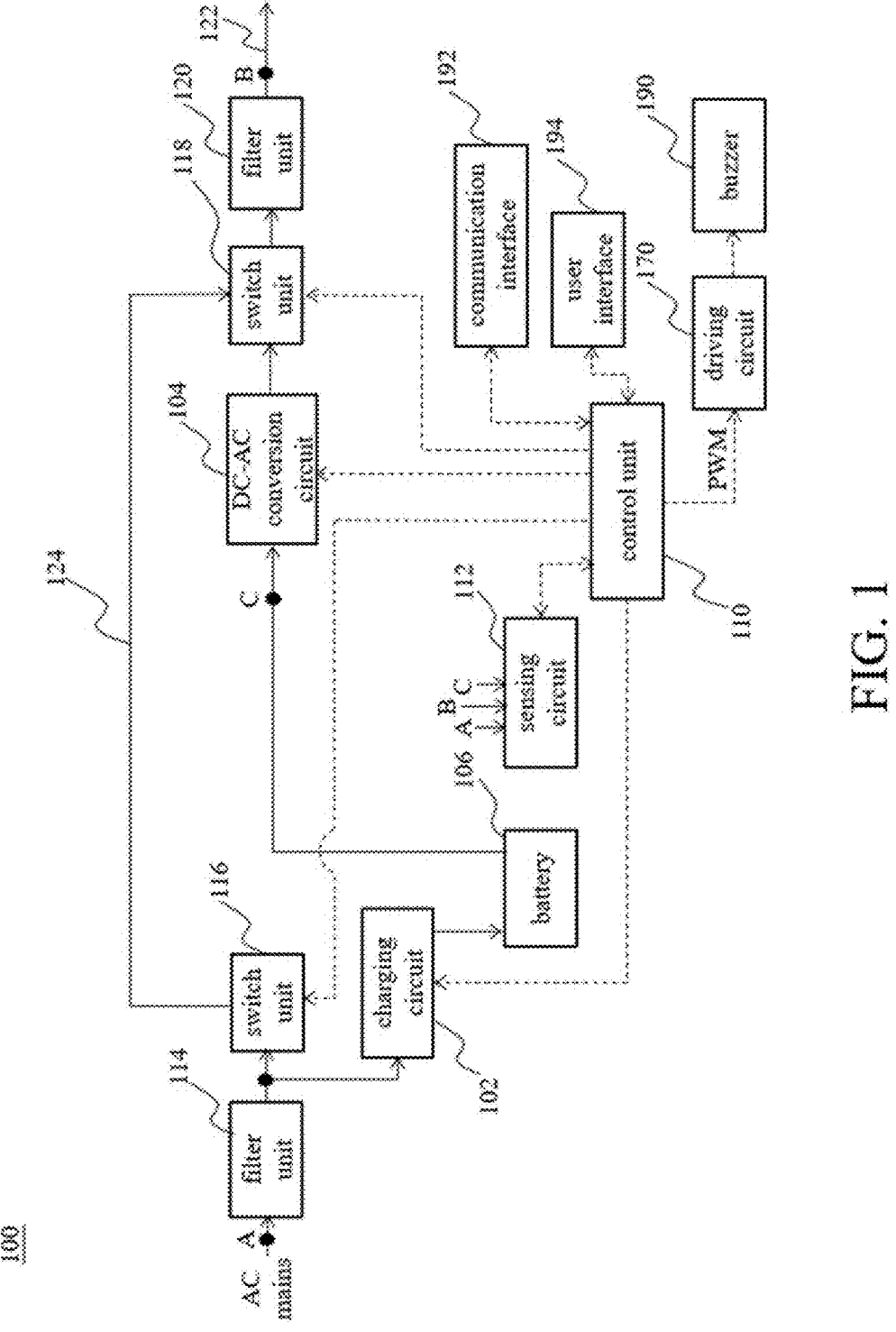
FIG. 1 illustrates a power device according to an embodiment of the present invention.

FIG. 1 illustrates a power device according to an embodiment of the present invention. As shown in FIG. 1, the power device 100 is a UPS. It can be seen from the circuit structure shown in FIG. 1 that the power device 100 is an off-line UPS. The power device 100 comprises a filter unit 114, a switch unit 116, a DC-AC conversion circuit 104, a switch unit 118, a filter unit 120, a charging circuit 102, a battery 106, a sensing circuit 112, a control unit 110, a driving circuit 170, a buzzer 190, a communication interface 192, a user interface 194 and a bypass path 124.

The switch unit 116 is electrically coupled to one terminal of the bypass path 124, and is electrically coupled to the AC power source (e.g., AC mains) through the filter unit 114. The switch unit 118 is electrically coupled to the other terminal of the bypass path 124, and is electrically coupled to the output terminal 122 of the UPS through the filter unit 120. The charging circuit 102 is electrically coupled to the battery 106 and electrically coupled to the AC power source through the filter unit 114. The DC-AC conversion circuit 104 is electrically coupled between the battery 106 and the switch unit 118. In addition, the driving circuit 170 is electrically coupled to the buzzer 190, and the switch unit 116, the switch unit 118, the charging circuit 102, the DC-AC conversion circuit 104, the communication interface 192, the user interface 194 and the driving circuit 170 are electrically coupled to the control unit 110 to be controlled by the control unit 110. For example, the control unit 110 can control the operation of the switch unit 118 to decide to electrically couple the output terminal of the DC-AC conversion circuit 104 to the filter unit 120, or to electrically couple the bypass path 124 to the filter unit 120.

In this embodiment, the sensing circuit 112 is further electrically coupled to the aforementioned AC power source, the output terminal 122 of the UPS and the input terminal of the DC-AC conversion circuit 104 (as indicated by coupling points A, B and C respectively) to obtain a sensing result and transmit the sensing result to the control unit 110, so that the control unit 110 can determine a current state of the UPS accordingly. In addition, the control unit 110 records a plurality of PWM (pulse width modulation) frequencies corresponding to various pitches, and is configured to generate a PWM signal according to an alert sound corresponding to a determination result (described in detail later), and to change the frequency of the PWM signal according to at least two pitches of the aforementioned alert sound. As for the driving circuit 170, it is configured to drive the buzzer 190 to emit the alert sound according to the PWM signal.

Figure 2:
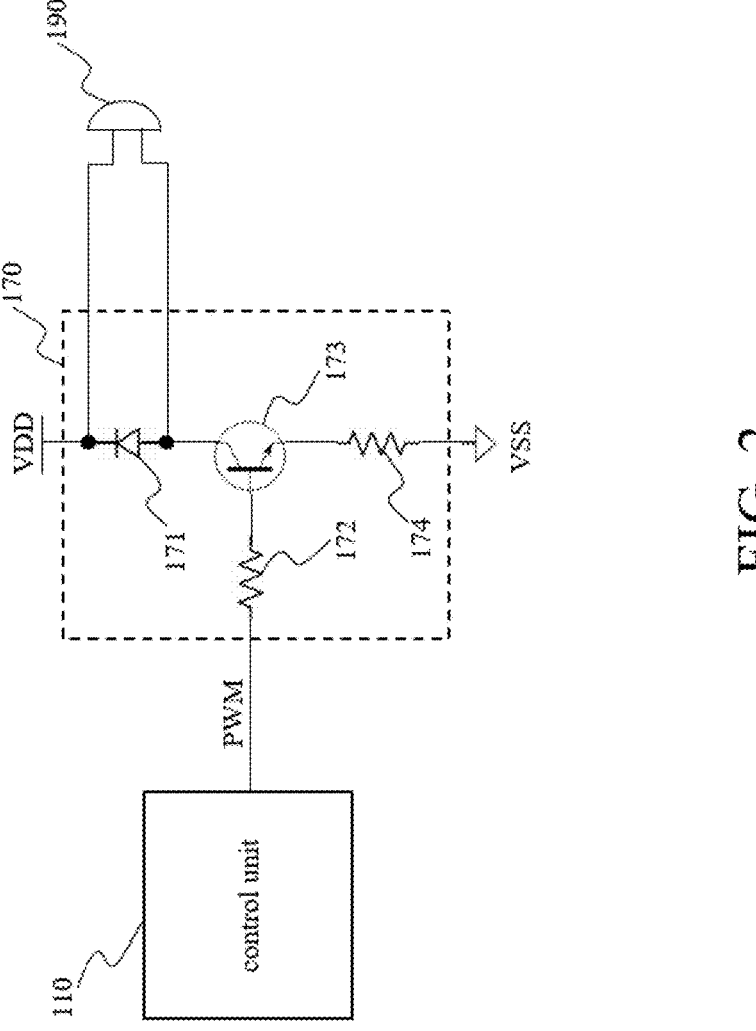
FIG. 2 illustrates one implementation of the driving circuit.

FIG. 2 illustrates one implementation of the driving circuit. Please refer to FIG. 2. In this embodiment, the driving circuit 170 comprises a diode 171, an NPN BJT (n-p-n bipolar junction transistor) 173, and resistors 172 and 174. The NPN BJT 173 comprises a base, a collector and an emitter. One terminal of the resistor 172 is electrically coupled to the control unit 110 to receive the PWM signal, and the other terminal of the resistor 172 is electrically coupled to the aforementioned base. The resistor 174 is electrically coupled between a reference potential VSS and the emitter. An anode of the diode 171 is electrically coupled to the collector and one terminal of the buzzer 190, and a cathode of the diode 171 is electrically coupled to an operation voltage VDD and the other terminal of the buzzer 190. Certainly, the circuit structure of the driving circuit 170 shown in FIG. 2 is only used as an example and is not intended to limit the invention. Those of ordinary skill in the art should know that the driving circuit 170 can also be implemented by other circuit structures.

Figure 3:
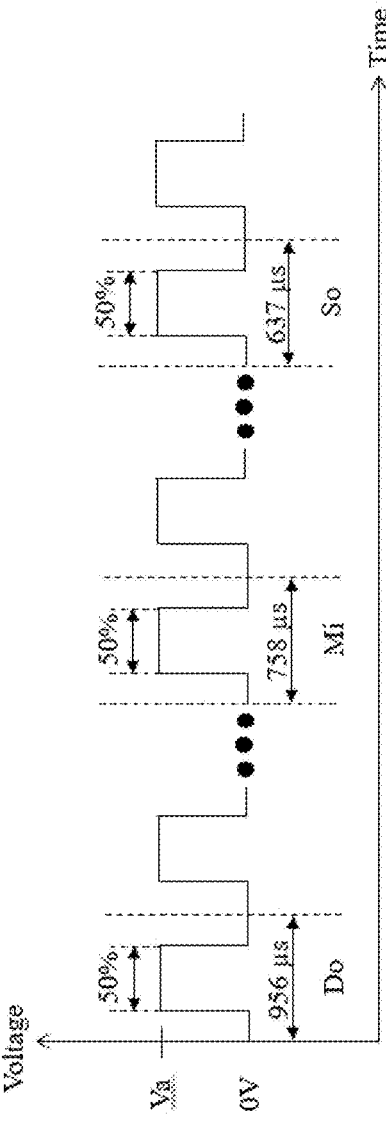
FIG. 3 is used to illustrate one of the alert sounds.
Figure 4:
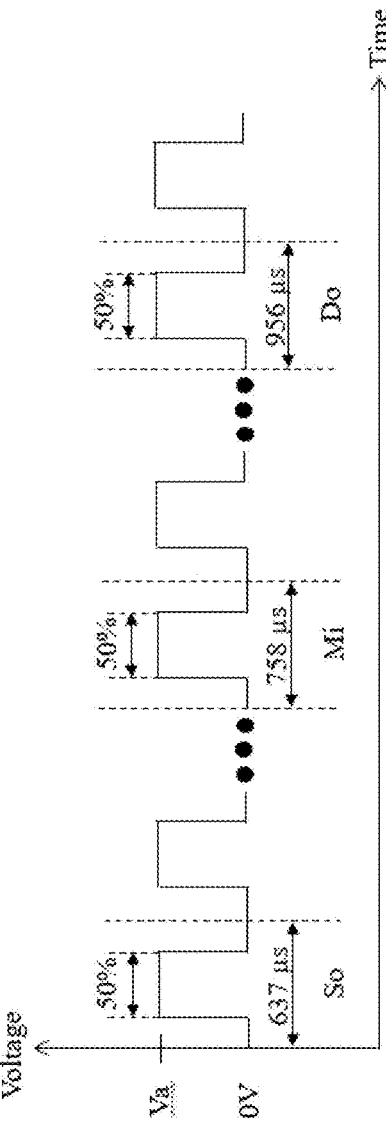
FIG. 4 is used to illustrate another alert sound.

FIG. 3 is used to illustrate one of the alert sounds. As shown in FIG. 3, the voltage level of this PWM signal changes between 0V and Va, and the duty cycle is maintained at 50%. When the frequency of the PWM signal is 956 μs (microseconds), the buzzer 190 emits a sound with a pitch of Do; when the frequency of the PWM signal is 758 μs, the buzzer 190 emits a sound with a pitch of Mi; and when the frequency of the PWM signal is 637 μs, the buzzer 190 emits a sound with a pitch of So. Since the frequency changes of this PWM signal are 956 μs, 758 μs and 637 μs in sequence, the buzzer emits an alert sound with pitches of Do, Mi and So in sequence. FIG. 4 is used to illustrate another alert sound. As shown in FIG. 4, the frequency changes of this PWM signal are 637 μs, 758 μs and 956 μs in sequence, so the buzzer 190 emits an alert sound with pitches of So, Mi and Do in sequence.

As can be seen from the description of FIGS. 3 and 4, different alert sounds can be used to represent different states of the UPS, and can also be used to represent different behaviors of the UPS. Therefore, users can instantly obtain and identify the current state of the UPS according to the alert sound emitted by the buzzer 190, or obtain and identify the current behavior of the UPS according to the alert sound emitted by the buzzer 190.

In addition, although the two alert sounds described in FIGS. 3 and 4 have three pitches of Do, Mi and So, this is only used as an example and is not intended to limit the invention. That is to say, which pitches are comprised in each alert sound, the order of the pitches in each alert sound, the time length of each pitch, and the number of times each pitch appears can be changed according to actual design requirements. For example, an alert sound can be designed to have a pitch combination of Mi, Fa and Sol in sequence, or a pitch combination of Fa, Mi, Fa and La in sequence, or a pitch combination of La and Si. From the above description, those of ordinary skill in the art should know that as long as an alert sound has at least two pitches, it is within the scope of protection of the present invention. In addition, the volume of each pitch can also be changed according to actual design requirements, this can be achieved by changing the voltage level of Va. The higher the voltage level Va, the louder the buzzer 190 sounds.

In addition, it is conceivable that if there are a plurality of UPSs in the same field, users only need to set different alert sounds for these UPSs for the same state or the same behavior, so that users can clearly identify which UPS has emitted an alert sound, and determine the state or behavior of the UPS according to the alert sound they heard.

Figure 5:
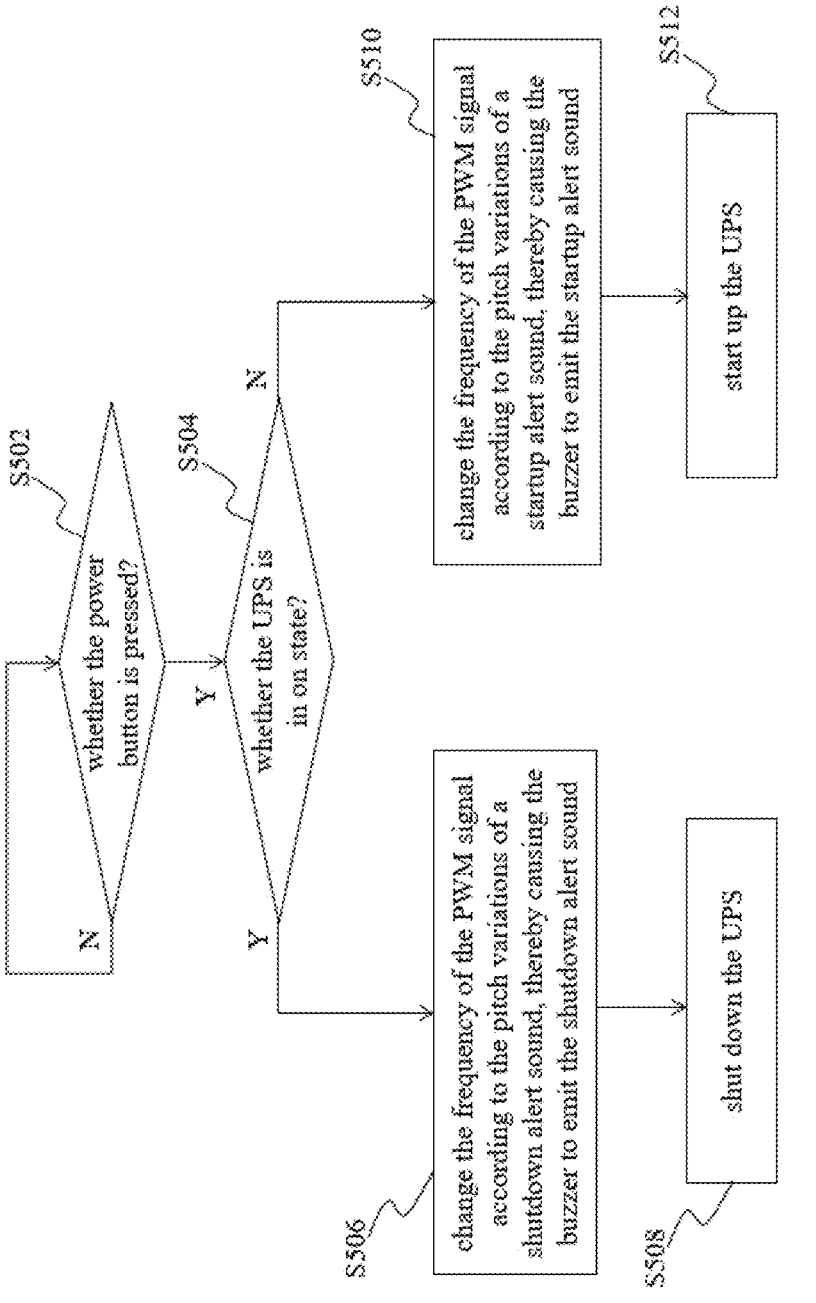
FIG. 5 shows a process for illustrating one of the alert sound applications of the power device 100.

FIG. 5 shows a process for illustrating one of the alert sound applications of the power device 100. Please refer to FIGS. 5 and 1. First, the control unit 110 determines whether the power button of the UPS is pressed (as shown in step S502). In step S502, when the determination result is no, the control unit 110 returns to step S502; when the determination result is yes, the control unit 110 determines whether the UPS is in on state (as shown in step S504). When the determination result in step S504 indicates that the UPS is in on state, the control unit 110 changes the frequency of the PWM signal according to the pitch variations of a shutdown alert sound, thereby causing the buzzer 190 to emit the shutdown alert sound (as shown in step S506), such as to emit the alert sound described in FIG. 3. Then, the control unit 110 shuts down the UPS (as shown in step S508).

On the contrary, when the determination result in step S504 shows that the UPS is not in on state (i.e., in off state), the control unit 110 changes the frequency of the PWM signal according to the pitch variations of a startup alert sound, thereby causing the buzzer 190 to emit the startup alert sound (as shown in step S510). Certainly, the alert sound corresponding to the UPS in on state is different from the alert sound corresponding to the UPS in off state, for example, the alert sound as described in FIG. 4 is emitted. Then, the control unit 110 starts up the UPS (as shown in step S512).

Figure 6:
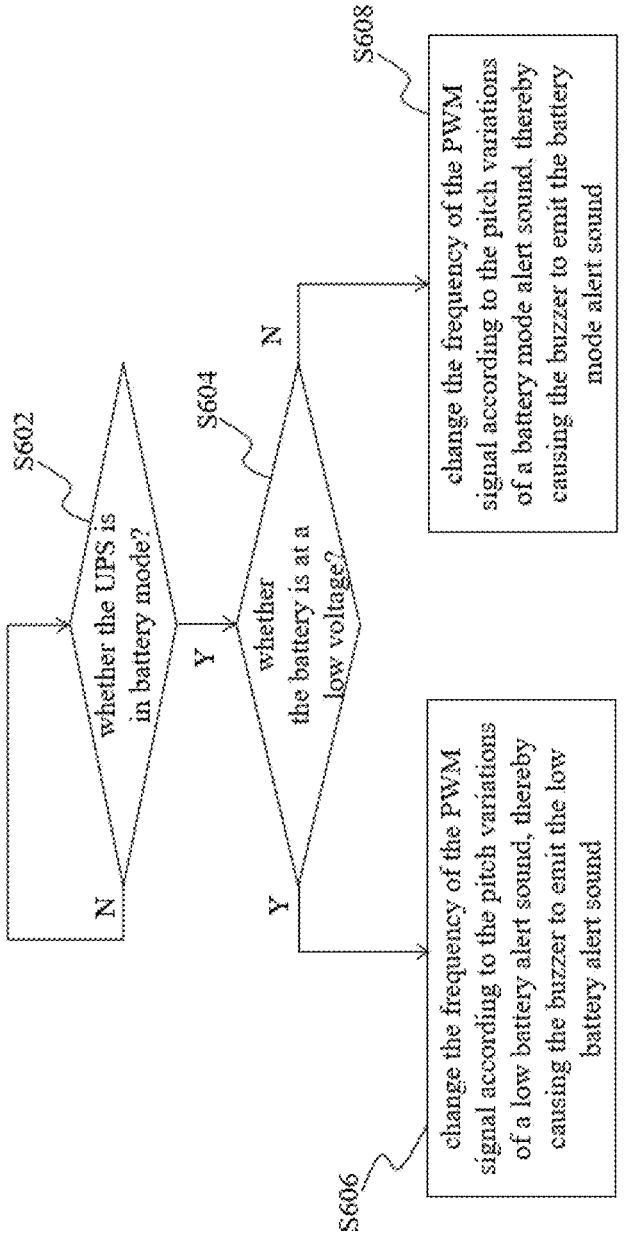
FIG. 6 shows a process for illustrating another one of the alert sound applications of the power device 100.

FIG. 6 shows a process for illustrating another one of the alert sound applications of the power device 100. Please refer to FIGS. 6 and 1. First, the control unit 110 determines whether the UPS is in battery mode (as shown in step S602). In step S602, when the determination result is no, the control unit 110 returns to step S602; when the determination result is yes, the control unit 110 determines whether the battery 106 of the UPS is at a low voltage according to the sensing result provided by the sensing circuit 112 (as shown in step S604). When the determination result in step S604 shows that the battery 106 of the UPS is at the low voltage, the control unit 110 changes the frequency of the PWM signal according to the pitch variations of a low battery alert sound, thereby causing the buzzer 190 to emit the low battery alert sound (as shown in step S606), for example, to emit the alert sound described in FIG. 3, or to emit a third alert sound.

On the contrary, when the determination result in step S604 shows that the battery 106 of the UPS is not at the low voltage, the control unit 110 changes the frequency of the PWM signal according to the pitch variations of a battery mode alert sound, thereby causing the buzzer 190 to emit the battery mode alert sound (as shown in step S608), for example, to emit the alert sound described in FIG. 4, or to emit a fourth alert sound. In short, the alert sound emitted when the battery 106 is at the low voltage is different from the alert sound emitted when the battery 106 is not at the low voltage.

Figure 7:
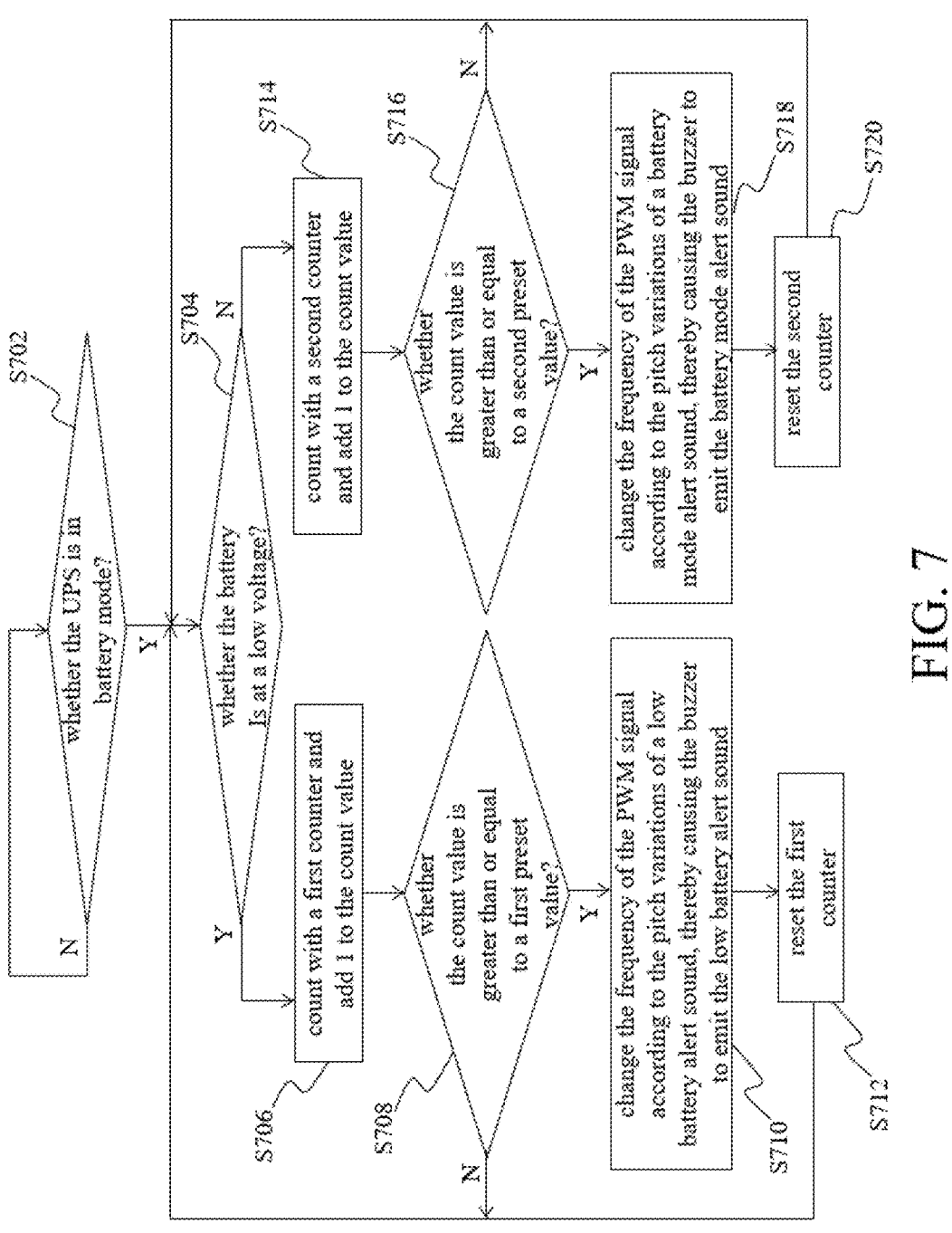
FIG. 7 shows a process for illustrating still another one of the alert sound applications of the power device 100.

FIG. 7 shows a process for illustrating still another one of the alert sound applications of the power device 100. Please refer to FIGS. 7 and 6. Compared with FIG. 6, the process shown in FIG. 7 has additional steps of counting with a first counter and adding 1 to the count value (as shown in step S706), determining whether the count value being greater than or equal to a first preset value (as shown in step S708), resetting the first counter (as shown in step S712), counting with a second counter and adding 1 to the count value (as shown in step S714), determining whether the count value being greater than or equal to a second preset value (as shown in step S716), and resetting the second counter (as shown in step S720). The first preset value is, for example, 10 seconds, and the second preset value is, for example, 30 seconds. In this way, when the determination result in step S704 shows that the battery 106 is at the low voltage, the buzzer 190 emits the low battery alert sound every 10 seconds. Similarly, when the determination result in step S704 shows that the battery 106 is not at the low voltage, the buzzer 190 emits the battery mode alert sound every 30 seconds. In addition, although in this embodiment, the first preset value is 10 seconds and the second preset value is 30 seconds, this is only used as an example, and is not intended to limit the present invention.

Figure 8:
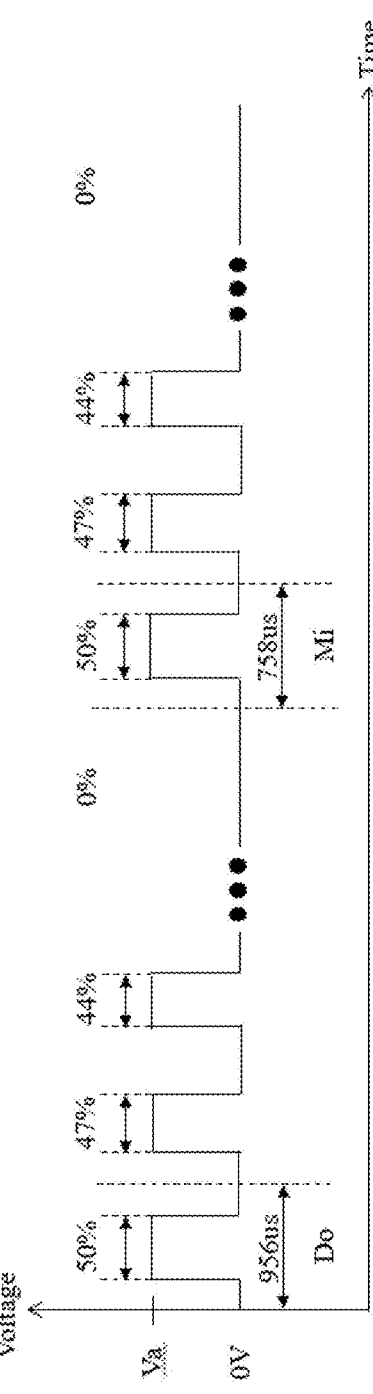
FIG. 8 is used to illustrate still another alert sound.

FIG. 8 is used to illustrate still another alert sound. As shown in FIG. 8, the voltage level of this PWM signal changes between 0V and Va. In addition, when the frequency of the PWM signal is 956 µs (microseconds), the buzzer 190 emits a sound with a pitch of Do; when the frequency of the PWM signal is 758 µs, the buzzer 190 emits a sound with a pitch of Mi. However, what is special is that when the buzzer 190 emits the pitch Do, the control unit 110 gradually reduces the duty cycle of the PWM signal from 50% to 0% to change the tone of the pitch Do. Similarly, when the buzzer 190 emits the pitch Mi, the control unit 110 gradually reduces the duty cycle of the PWM signal from 50% to 0% to change the tone of the pitch Mi. Certainly, the control unit 110 can also change the tone of any pitch by gradually increasing the duty cycle of the PWM signal.

As can be seen from the above description, the control unit 110 can change the tone of at least one pitch by gradually changing the duty cycle of the PWM signal corresponding to at least one pitch. This means that the tone of each pitch can also be changed according to actual design requirements.

Please refer to FIG. 1 again. In this embodiment, the control unit 110 is further electrically coupled to a network through the communication interface 192, and the control unit 110 is further configured to provide a web user interface. The web user interface is configured for users to set alert sounds under different determination results, and to set which pitches are comprised in each alert sound, an order of the pitches, a tone of each pitch, a time length of each pitch and a volume of each pitch. In addition, in this embodiment, the user interface 194 is also configured for users to set alert sounds under different determination results, and to set which pitches are comprised in each alert sound, an order of the pitches, a tone of each pitch, a time length of each pitch and a volume of each pitch. In this embodiment, the user interface 194 comprises a touch display panel.

In addition, although in this embodiment, the sensing circuit 112 is electrically coupled to the AC power source, the output terminal 122 of the UPS and the input terminal of the DC-AC conversion circuit 104, this is not intended to limit the present invention. Those of ordinary skill in the art should know that the sensing circuit 112 may also be electrically coupled to at least one of the AC power source, the output terminal 122 of the UPS, and the input terminal of the DC-AC conversion circuit 104. It is worth mentioning that although in this embodiment, the UPS comprises the filter unit 114, the filter unit 120, the battery 106, the communication interface 192 and the user interface 194, this is not intended to limit the present invention. Those of ordinary skill in the art should know that the use of these five components can be decided according to actual design requirements. For example, the UPS may not have the battery 106 inside, but instead use an external battery 106.

According to the above teachings, those of ordinary skill in the art should know that the above concept of alert sounds can also be applied to other UPSs with different architectures. Certainly, the above-mentioned concept of alert sounds can also be applied to other different types of power devices, such as power distribution units (PDU) and automatic transfer switches (ATS). Please see the instructions below.

Figure 9:
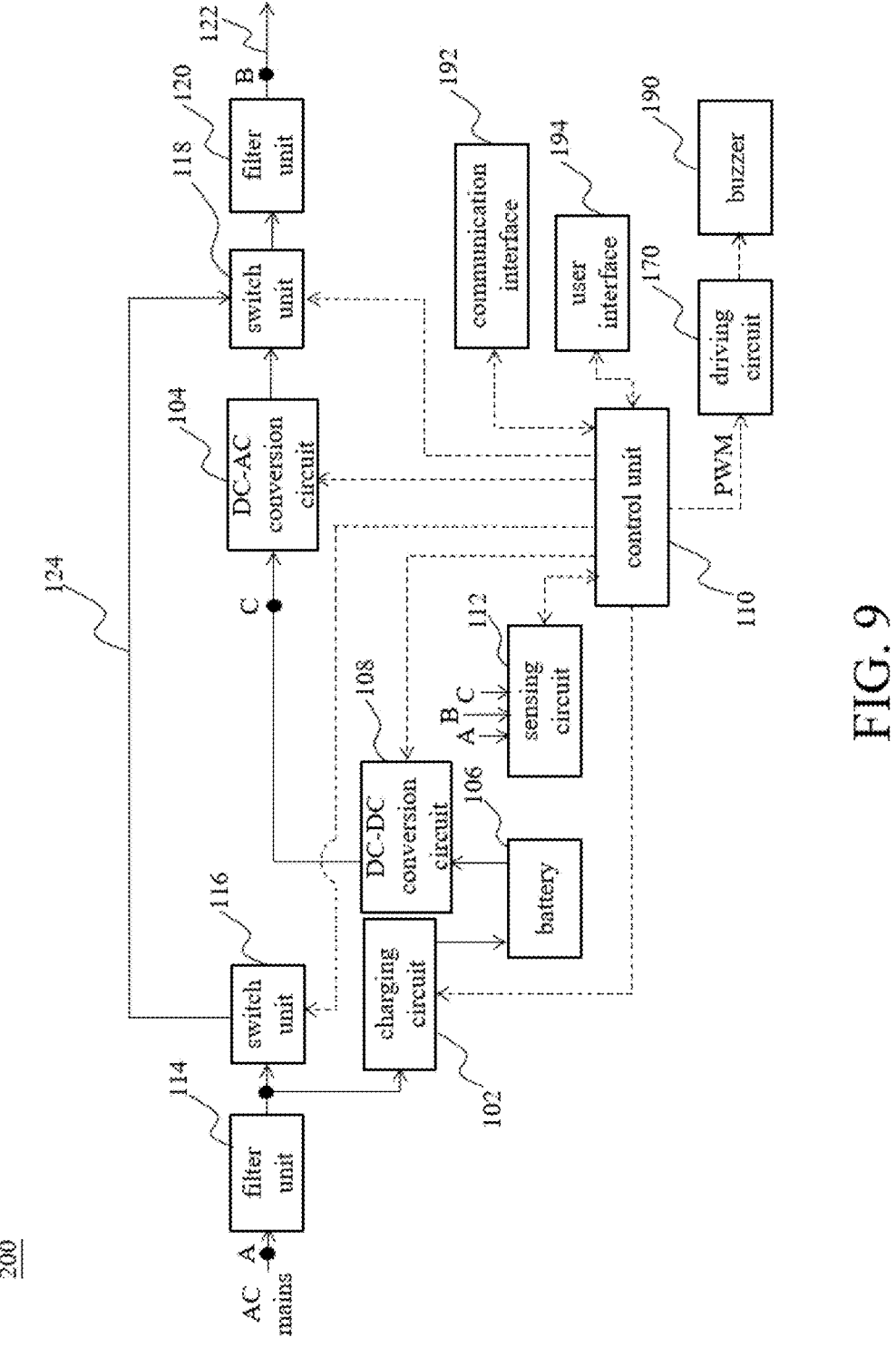
FIG. 9 illustrates a power device according to another embodiment of the present invention.

FIG. 9 illustrates a power device according to another embodiment of the present invention. As shown in FIG. 9, the power device 200 is a UPS. It can be seen from the circuit structure shown in FIG. 9 that the power device 200 is an off-line UPS. Compared with the off-line UPS shown in FIG. 1, the off-line UPS shown in FIG. 9 further comprises a DC-DC conversion circuit 108. The DC-DC conversion circuit 108 is electrically coupled between the battery 106 and the input terminal of the DC-AC conversion circuit 104, and is electrically coupled to the control unit 110 to be controlled by the control unit 110.

Figure 10:
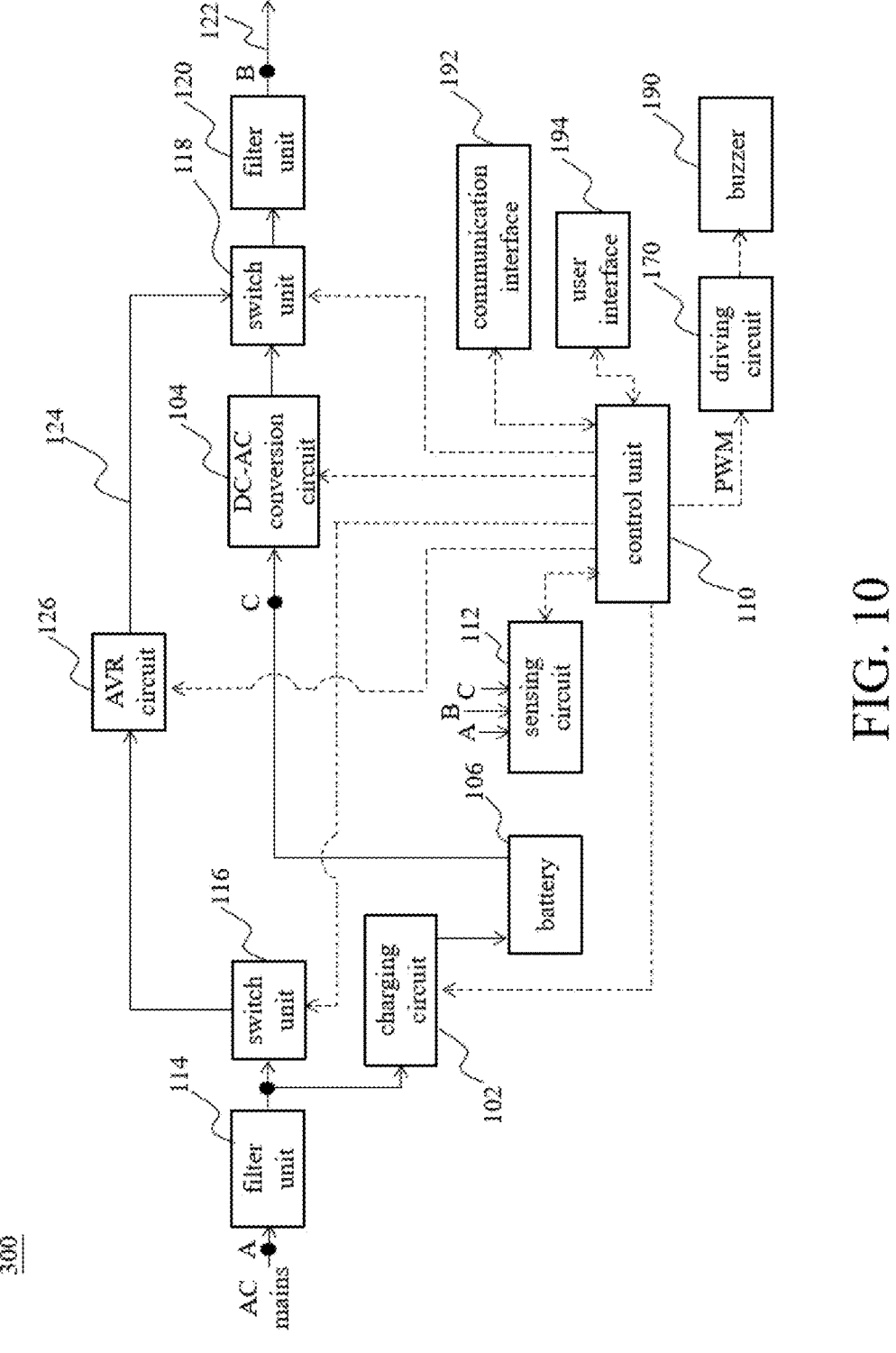
FIG. 10 illustrates a power device according to still another embodiment of the present invention.

FIG. 10 illustrates a power device according to still another embodiment of the present invention. As shown in FIG. 10, the power device 300 is a UPS. It can be seen from the circuit structure shown in FIG. 10 that the power device 300 is a line-interactive UPS. Compared with the off-line UPS shown in FIG. 1, the line-interactive UPS shown in FIG. 10 further comprises an AVR (automatic voltage regulation) circuit 126. The AVR circuit 126 is configured on the bypass path 124, and is electrically coupled to the control unit 110 to be controlled by the control unit 110.

Figure 11:
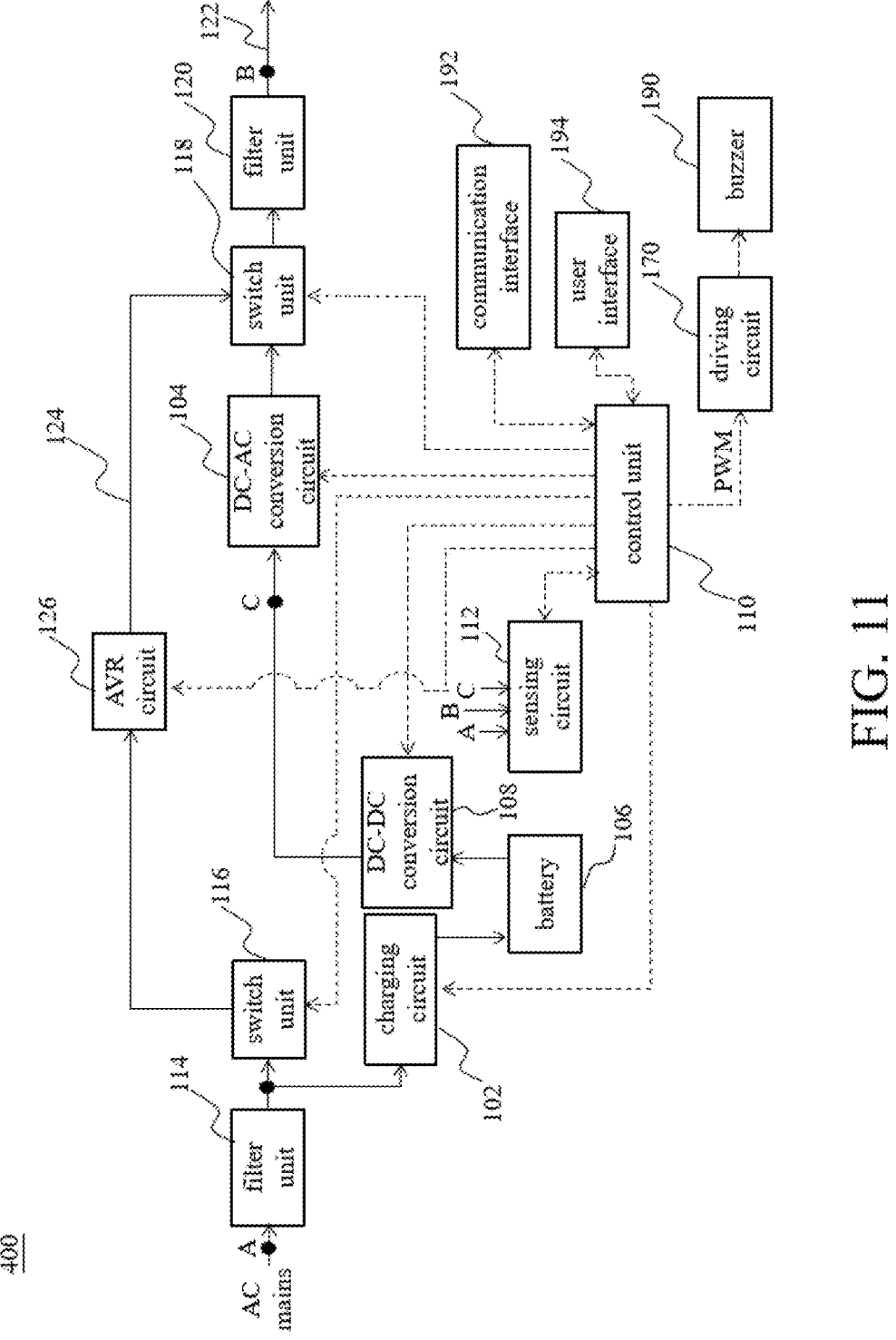
FIG. 11 illustrates a power device according to still another embodiment of the present invention.

FIG. 11 illustrates a power device according to still another embodiment of the present invention. As shown in FIG. 11, the power device 400 is a UPS. It can be seen from the circuit structure shown in FIG. 11 that the power device 400 is a line-interactive UPS. Compared with the line-interactive UPS shown in FIG. 10, the line-interactive UPS shown in FIG. 11 further comprises a DC-DC conversion circuit 108. The DC-DC conversion circuit 108 is electrically coupled between the battery 106 and the input terminal of the DC-AC conversion circuit 104, and is electrically coupled to the control unit 110 to be controlled by the control unit 110.

Figure 12:
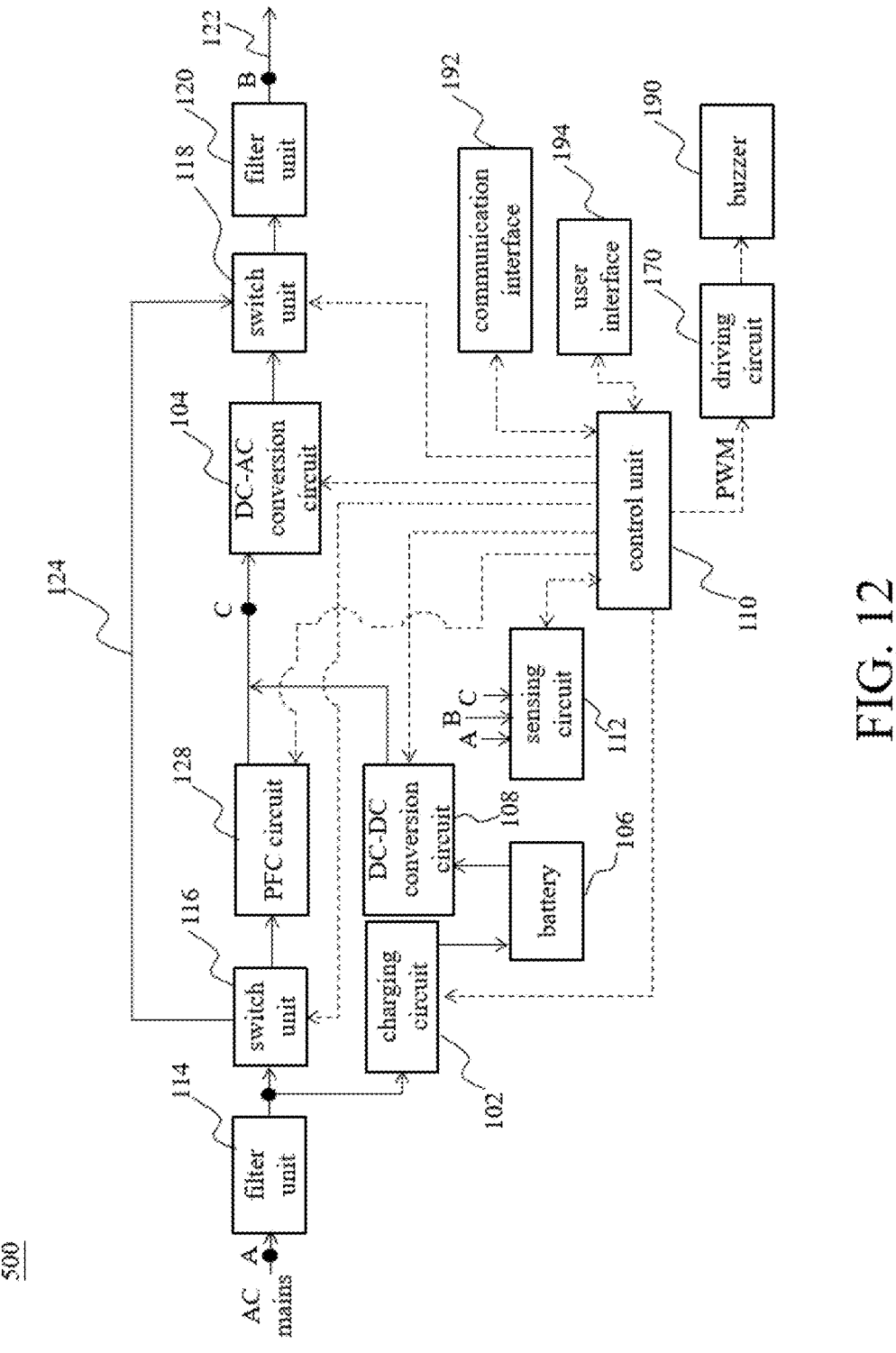
FIG. 12 illustrates a power device according to still another embodiment of the present invention.

FIG. 12 illustrates a power device according to still another embodiment of the present invention. As shown in FIG. 12, the power device 500 is a UPS. It can be seen from the circuit structure shown in FIG. 12 that the power device 500 is an on-line UPS. Compared with the off-line UPS shown in FIG. 9, the on-line UPS shown in FIG. 12 further comprises a PFC (power factor correction circuit) circuit 128. The PFC circuit 128 is electrically coupled between the switch unit 116 and the input terminal of the DC-AC conversion circuit 104, and is electrically coupled to the control unit 110 to be controlled by the control unit 110. In addition, in this embodiment, the control unit 110 can control the operation of the switch unit 116 to decide to electrically couple the filter unit 114 to the bypass path 124, or to electrically couple the filter unit 114 to the input terminal of the PFC circuit 128.

Figure 13:
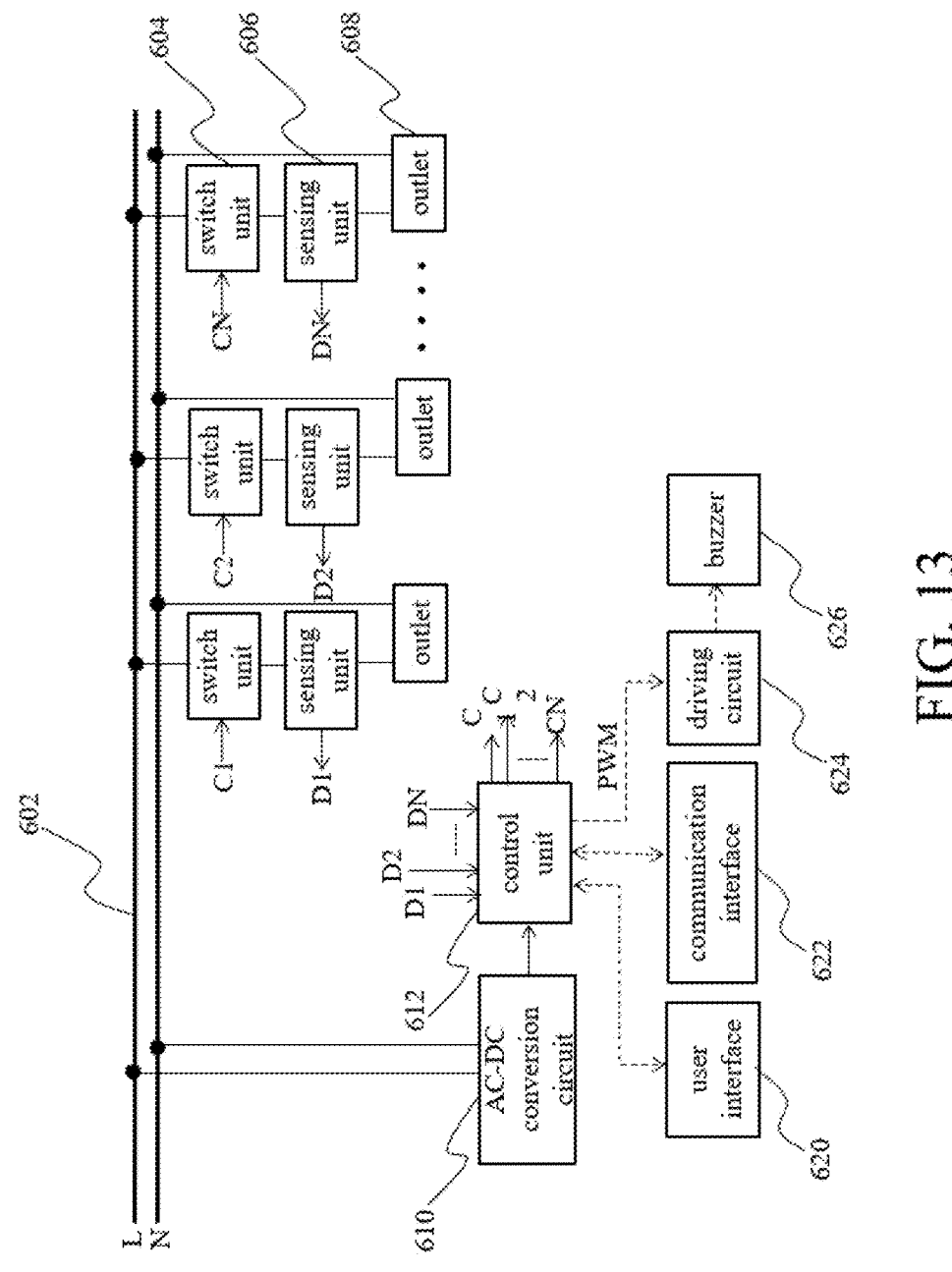
FIG. 13 illustrates a power device according to still another embodiment of the present invention.

FIG. 13 illustrates a power device according to still another embodiment of the present invention. As shown in FIG. 13, the power device 600 is a PDU. The power device 600 comprises two conductors (as shown by the mark 602), a plurality of switch units (as shown by the mark 604), a plurality of sensing units (as shown by the mark 606), a plurality of outlets (as shown by the mark 608), AC-DC conversion circuit 610, control unit 612, user interface 620, communication interface 622, driving circuit 624 and buzzer 626. As shown in FIG. 13, the two conductors 602 are electrically coupled to the live wire (as shown by the mark L) and the neutral wire (as shown by the mark N) of the AC power source, respectively. Each switch unit 604 is electrically coupled to one of the two conductors 602. Each sensing unit 606 is electrically coupled to one of the switch units 604. Each outlet 608 is electrically coupled to one of the sensing units 606 and to the other of the two conductors 602. The AC-DC conversion circuit 610 is electrically coupled to the two conductors, and supplies operation voltage to the control unit 612.

In addition, the switch units 604, the user interface 620, the communication interface 622 and the driving circuit 624 are electrically coupled to the control unit 612 to be controlled by the control unit 612. Marks C1 to CN represent the control signals for controlling the switch units 604, respectively, where N is a natural number. In addition, the sensing units 606 are electrically coupled to the control unit 612 to provide sensing signals D1 to DN to the control unit 612, respectively. In this embodiment, the control unit 612 also provides the PWM signal to the driving circuit 624. Therefore, the buzzer 626 can emit different alert sounds to make users to instantly obtain and identify the current state and behavior of the PDU. For example, the buzzer 626 can emit different alert sounds to indicate whether the PDU is in on state or in off state. Since the functions and operations of the control unit 612, the driving circuit 624 and the buzzer 626 can refer to the functions and operations of the control unit 110, the driving circuit 170 and the buzzer 190 in FIG. 1, these will not be repeated here.

In addition, in this embodiment, the control unit 612 is further electrically coupled to a network through the communication interface 622, and the control unit 612 is further configured to provide a web user interface. The web user interface is configured for users to set alert sounds under different determination results, and to set which pitches are comprised in each alert sound, an order of the pitches, a tone of each pitch, a time length of each pitch and a volume of each pitch. In addition, in this embodiment, the user interface 620 is also configured for users to set alert sounds under different determination results, and to set which pitches are comprised in each alert sound, an order of the pitches, a tone of each pitch, a time length of each pitch and a volume of each pitch. In this embodiment, the user interface 620 comprises a touch display panel.

Figure 14:
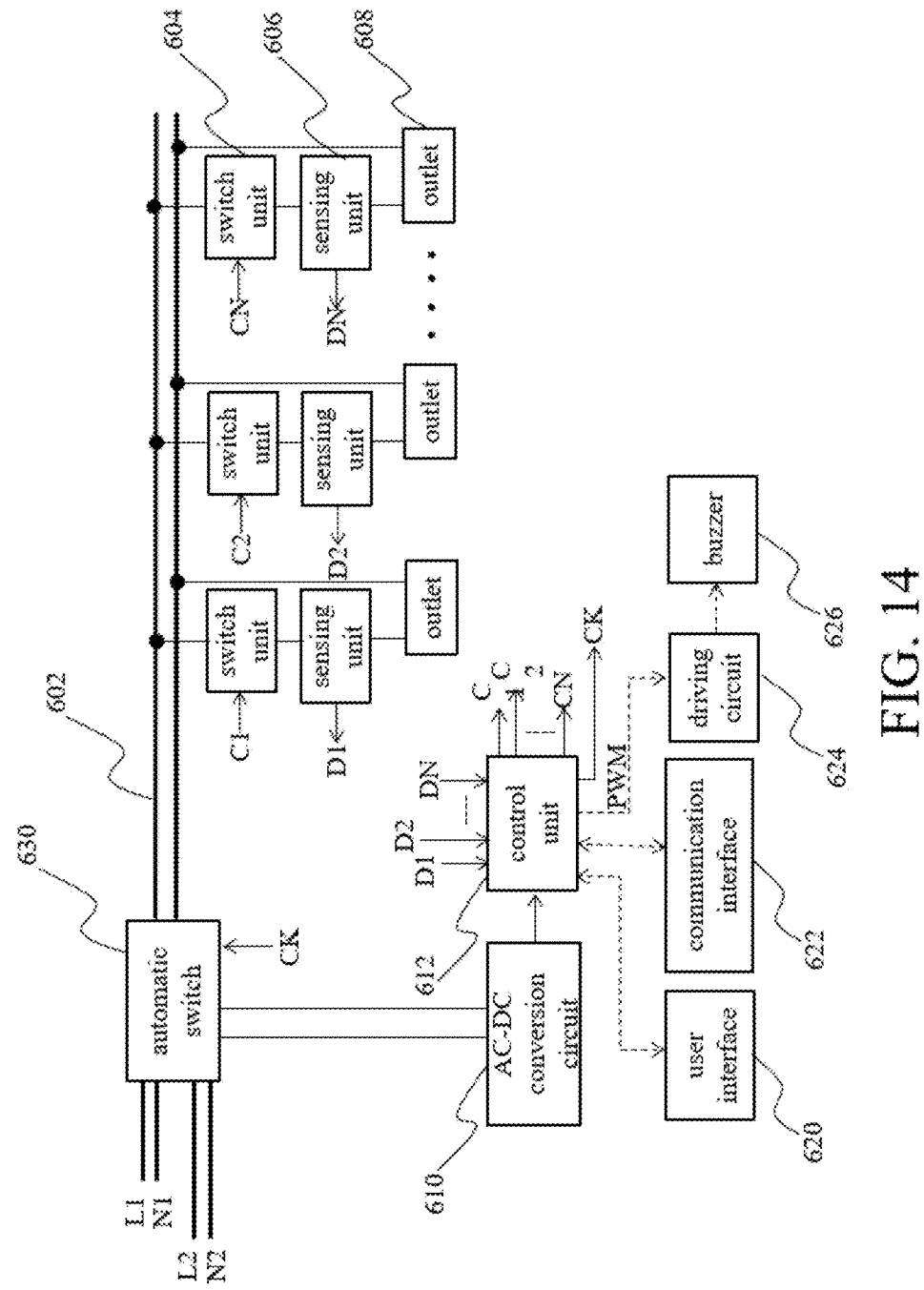
FIG. 14 illustrates a power device according to still another embodiment of the present invention.

FIG. 14 illustrates a power device according to still another embodiment of the present invention. As shown in FIG. 14, the power device 700 is an ATS. Compared with the PDU shown in FIG. 13, the ATS shown in FIG. 14 further comprises an automatic switch 630. In addition to being electrically coupled to the two conductors 602, the automatic switch 630 is also electrically coupled to two AC power sources. The live wire and the neutral wire of one AC power source are marked by L1 and N1, respectively, while the live wire and the neutral wire of the other AC power source are marked by L2 and N2, respectively. In addition, the control unit 612 also uses the control signal CK to control the operation of the automatic switch 630, so as to control the automatic switch 630 to select one of the AC power sources to be electrically coupled to the two conductors 602.

Figure 15:
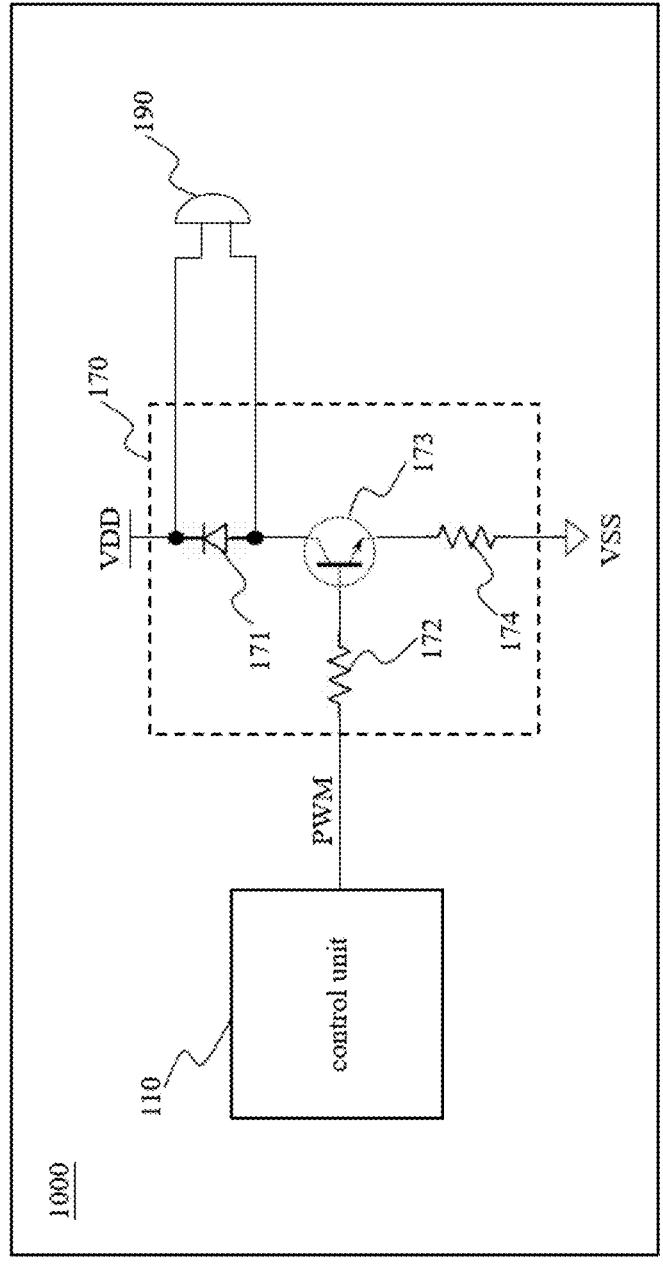
FIG. 15 shows a main block diagram of the power device of the present invention.

According to the description of the above embodiments, the main block diagram of the power device of the present invention can be summarized, as shown in FIG. 15. Please refer to FIG. 15. The power device 1000 mainly comprises a control unit 110, a driving circuit 170 and a buzzer 190. The driving circuit 170 can be implemented by a diode 171, an NPN BJT 173, and resistors 172 and 174. In summary, since the control unit 110 can change the frequency and the duty cycle of the PWM signal, causing the buzzer 190 to emit alert sounds with different pitches and different tones.

The above-described embodiments are only for illustrating the technical ideas and characteristics of the present invention. Their purpose is to enable those of ordinary skill in the art to understand the content of the present invention and implement it accordingly. They cannot be used to limit the patent scope of the present invention. Any equivalent changes or modifications made in accordance with the spirit disclosed in the present invention should still be covered by the patent scope of the present invention.

What is claimed is:

1. A power device, wherein the power device is a UPS, the power device comprising:

a buzzer;

a control unit, configured for recording a plurality of PWM frequencies corresponding to various pitches, generating a PWM signal according to an alert sound corresponding to a determination result, and changing the frequency of the PWM signal according to at least two pitches of the alert sound;

a driving circuit, configured for driving the buzzer to emit the alert sound according to the PWM signal;

a first switch unit, electrically coupled to an AC power source and one terminal of a bypass path;

a second switch unit, electrically coupled to an output terminal of the UPS and the other terminal of the bypass path;

a charging circuit, electrically coupling the AC power source and a battery;

a DC-AC conversion circuit, electrically coupled between the battery and the second switch unit; and a sensing circuit, electrically coupled to at least one of the AC power source, the output terminal of the UPS and the input terminal of the DC-AC conversion circuit to obtain a sensing result, wherein the sensing circuit, the first switch unit, the second switch unit, the charging circuit and the DC-AC conversion circuit are electrically coupled to the control unit to be controlled by the control unit, and wherein the control unit obtains the determination result according to the sensing result, the determination result shows whether the battery of the UPS is at a low voltage, and the alert sound emitted when the battery is at the low voltage is different from the alert sound emitted when the battery is not at the low voltage.

2. The power device as claimed in claim 1, wherein when the buzzer emits the alert sound, the control unit further gradually changes a duty cycle of the PWM signal corresponding to at least one pitch, thereby changing a tone of the at least one pitch.

3. The power device as claimed in claim 2, wherein the control unit gradually reduces the duty cycle of the PWM signal corresponding to the at least one pitch.

4. The power device as claimed in claim 1, wherein the driving circuit comprises:

an NPN BJT, having a base, a collector and an emitter;

a first resistor, one terminal of which being electrically coupled to the control unit to receive the PWM signal, and the other terminal of which being electrically coupled to the base;

a second resistor, electrically coupled between a reference potential and the emitter; and a diode, an anode of which being electrically coupled to the collector and one terminal of the buzzer, and a cathode of which being electrically coupled to an operation voltage and the other terminal of the buzzer.

5. The power device as claimed in claim 1, wherein the control unit is further configured to provide a web user interface, and the web user interface is configured for a user to set alert sounds under different determination results, and to set which pitches are comprised in each alert sound, an order of the pitches, a tone of each pitch, a time length of each pitch and a volume of each pitch.

6. The power device as claimed in claim 1, further comprising a user interface electrically coupled to the control unit, wherein the user interface is configured for a user to set alert sounds under different determination results, and to set which pitches are comprised in each alert sound, an order of the pitches, a tone of each pitch, a time length of each pitch and a volume of each pitch.

7. The power device as claimed in claim 6, wherein the user interface comprises a touch display panel.

8. The power device as claimed in claim 1, further comprising a DC-DC conversion circuit electrically coupled between the battery and the input terminal of the DC-AC conversion circuit.

9. The power device as claimed in claim 8, further comprising a PFC circuit electrically coupled between the first switch unit and the input terminal of the DC-AC conversion circuit.

10. The power device as claimed in claim 1, further comprising an AVR (automatic voltage regulation) circuit configured on the bypass path.

\* \* \* \* \*